United States Patent
Guidat et al.

(10) Patent No.: US 10,046,295 B2
(45) Date of Patent: Aug. 14, 2018

(54) METHODS FOR SCALE-UP OF CONTINUOUS REACTORS

(75) Inventors: Roland Guidat, Blennes (FR); Olivier Lobet, Villiers sous Grez (FR); Pierre Woehl, Strasbourg (FR)

(73) Assignee: Corning Incorporated, Corning, NY (US)

( * ) Notice: Subject to any disclaimer, the term of this patent is extended or adjusted under 35 U.S.C. 154(b) by 384 days.

(21) Appl. No.: 14/125,720

(22) PCT Filed: Jun. 7, 2012

(86) PCT No.: PCT/US2012/041192
§ 371 (c)(1),
(2), (4) Date: Dec. 12, 2013

(87) PCT Pub. No.: WO2012/173848
PCT Pub. Date: Dec. 20, 2012

(65) Prior Publication Data
US 2014/0115871 A1    May 1, 2014

(30) Foreign Application Priority Data
Jun. 14, 2011    (EP) .................................... 11305743

(51) Int. Cl.
B01J 19/00    (2006.01)

(52) U.S. Cl.
CPC ....... B01J 19/0053 (2013.01); B01J 19/0093 (2013.01); *B01J 2219/00015* (2013.01);
(Continued)

(58) Field of Classification Search
CPC ................ B01J 19/0093; B01J 19/0053; B01J 2219/00015; B01J 2219/00824;
(Continued)

(56) References Cited

U.S. PATENT DOCUMENTS

| 6,955,738 B2 * | 10/2005 | Derand ................ B01J 19/0093 156/272.6 |
| 7,007,710 B2 * | 3/2006 | Heller ................. H01J 49/0018 137/15.01 |

(Continued)

FOREIGN PATENT DOCUMENTS

| CN | 1652865 | 8/2005 |
| CN | 101234323 | 8/2008 |

(Continued)

OTHER PUBLICATIONS

CN201280029238.6 Office Action dated Jan. 4, 2015.
(Continued)

*Primary Examiner* — Sarang Afzali
(74) *Attorney, Agent, or Firm* — Gregory V. Bean

(57) ABSTRACT

A method for scale-up of a micro reactor process from lab to production scale comprises using a wall material for a lab reactor having thermal conductivity ≤3 W/m·K, and using a wall material for a production reactor having thermal conductivity ≥5 W/m·K. Desirably, flow velocity is kept constant, and the height of the production-scale process channel is determined by:

$$H_G = \frac{2 \times \left(A + \frac{B}{\lambda_W} + \frac{1}{C \times (D_h)^{(b-1)}}\right)^{-1}}{h} = H_{G0}$$

wherein A B and C are constants; $H_G$ is the overall volumetric heat transfer coefficient, $D_h$ is the hydraulic diameter, $\lambda_W$ is the thermal conductivity of the wall, b is the empirically determined power to which the Reynolds number is raised in the equation for the Nusselt criteria (Nu=a·Re$^b$Pr$^c$) for the type of flow used, and h is the height of the channel, (Continued)

all in the production-scale process; and $H_{G0}$ is the overall volumetric heat transfer coefficient in the lab-scale process.

2 Claims, 2 Drawing Sheets

(52) U.S. Cl.
CPC ............... *B01J 2219/0086* (2013.01); *B01J 2219/00824* (2013.01); *B01J 2219/00831* (2013.01); *B01J 2219/00873* (2013.01); *B01J 2219/00995* (2013.01); *Y10T 29/49* (2015.01)

(58) Field of Classification Search
CPC ...... B01J 2219/00831; B01J 2219/0086; B01J 2219/00867; B01J 2219/00993; B01J 2219/00995; Y10T 29/49716
See application file for complete search history.

(56) References Cited

U.S. PATENT DOCUMENTS

| | | | |
|---|---|---|---|
| 7,670,567 B2* | 3/2010 | Lawal | B01J 19/0093 422/129 |
| 8,128,885 B2* | 3/2012 | Schwanke | B01J 19/0093 422/129 |
| 8,156,762 B2* | 4/2012 | Dannoux | B81C 99/0085 65/102 |
| 8,162,005 B2* | 4/2012 | Marques | B01J 19/2485 137/597 |
| 8,414,182 B2* | 4/2013 | Paul | B01F 5/061 366/336 |
| 8,574,500 B2* | 11/2013 | Meschke | B01J 19/0093 165/185 |
| 8,945,478 B2* | 2/2015 | Coulson | B01L 3/502707 422/502 |
| 9,023,296 B2* | 5/2015 | Roberge | B01J 19/0093 422/502 |
| 2003/0118486 A1* | 6/2003 | Zhou | B01J 19/0046 422/400 |
| 2005/0000569 A1* | 1/2005 | Bousse | H01J 49/0018 137/375 |
| 2005/0072915 A1* | 4/2005 | Stults | H01J 49/167 250/288 |
| 2006/0171864 A1 | 8/2006 | Caze et al. | |
| 2008/0181833 A1* | 7/2008 | Lawal | B01J 19/0093 422/606 |
| 2008/0230951 A1* | 9/2008 | Dannoux | B81C 99/0085 264/293 |
| 2009/0098030 A1* | 4/2009 | Schwanke | B01J 19/0093 422/198 |
| 2009/0120629 A1 | 5/2009 | Ashe | |
| 2009/0139590 A1* | 6/2009 | Marques | B01J 19/2485 137/833 |
| 2009/0245017 A1* | 10/2009 | Paul | B01F 5/061 366/337 |
| 2009/0304549 A1* | 12/2009 | Coulson | B01L 3/502707 422/68.1 |
| 2010/0071418 A1* | 3/2010 | Dannoux | B81C 99/0085 65/83 |
| 2010/0178214 A1* | 7/2010 | Marques | B01J 19/0093 422/139 |
| 2011/0076200 A1* | 3/2011 | Kato | B01J 4/008 422/111 |
| 2012/0045376 A1* | 2/2012 | Roberge | B01J 19/0093 422/600 |
| 2012/0258025 A1* | 10/2012 | Coulson | B01L 3/502707 422/502 |
| 2013/0216446 A1* | 8/2013 | Clingan | B01J 19/20 422/198 |
| 2014/0115871 A1* | 5/2014 | Guidat | B01J 19/0093 29/592 |
| 2015/0005429 A1* | 1/2015 | Nakamura | C01F 5/14 524/436 |
| 2015/0037237 A1* | 2/2015 | Nakamura | C09C 1/40 423/420.2 |

FOREIGN PATENT DOCUMENTS

| | | | | |
|---|---|---|---|---|
| WO | WO 2008143918 A1 * | 11/2008 | ......... | B01J 19/0093 |
| WO | 2009080755 | 7/2009 | | |
| WO | 2010104597 | 9/2010 | | |
| WO | 2010130811 | 11/2010 | | |
| WO | WO 2012030876 A1 * | 3/2012 | ......... | B01J 19/0093 |

OTHER PUBLICATIONS

EP11305743 Search Report dated Dec. 6, 2011.
Hessel et al; "Industrial and real-life applications of microreactor process engineering for fine and functional chemistry", Studies in Surface Science and Catalysis, vol. 159.
Hessel et al; "Review on patents in microreactor and micro process engineering", Recent Patents on Chemical Engineering, vol. 1, pp. 1-16, 2008.
Hessel; "Microreactor organic processing", Inaugural lecture, 2006.
"Holvey; ""Characterization ofMicroreactors with Respect to Pressure Drop, Heat Tranfer and Mixing Efficiency"""; Department ofChemical and Biological Engineering,University of Ottawa".
International Search Report and Written Opinion of the Internatinoal Searching Authority; PCT/US2012/041192 dated Aug. 14, 2012; 18 Pages.
"Karagiannidis et al. ""Numericalinvestigation on the start-up of methane-fueled catalytic microreactors"""; Combustion andFlame, No. 7, vol. 157".
Kockmann et al. "Scale-up concept ofsingle-channel microreactors fromprocess development to industrialproduction"; Chemical EngineeringJournal, No. 2-3, vol. 167.
Lavric et al; "Advanced-Flow™ glass reactors for seamless scale-up", Chemistry Today, 27(3), pp. 45-48, 2009.
Notificition Concerning Transmittal of International Preliminary Report on Patentablility; PCT/US2012/041192 dated Jan. 3, 2014; 12 Pages.
Rebrov et al; "Design of a Microstructured Reactor With Integrated Heat-Exchanger for Optimum Performance and Highly Exothermic Reactions"; Catalysis Today; vol. 69, No. 1-4; 2001 pp. 183-192.
Stief et al; "Numberical Investigations of Optimal Heat Conductivity in Micro Heat Exchangers"; Chemical Engineering and Technology, Weinheim DE; vol. 22, No. 4 1999; pp. 297-303.
Stutz et al; "Effects of Microreactor Wall Heat Conduction on the Reforming Process of Methane"; Chemical Engineering Science; vol. 60, No. 24, 2005 pp. 6983-6997.
Togashi et al; "Yield improvement of chemical reactions by using a microreactor and development of a pilot plant using the numbering-up of microreactors", Journal of Chemical Engineering of Japan, vol. 42, N°7, pp. 512-519, 2009.
Watts; Chemtrix: Rapid reaction optimization and scale-up in continuous flow reactors, CPAC Rome Workshop, 2010.
Zlokarnik; "Scale-up from miniplants", Chemical Enginering and Technology, vol. 27(1),p. 1, 2004.

* cited by examiner

METHODS FOR SCALE-UP OF CONTINUOUS REACTORS

CROSS-REFERENCE TO RELATED APPLICATIONS

This application claims the benefit of priority under 35 U.S.C. § 371 of International Application Serial No. PCT/US12/41192, filed on Jun. 7, 2012, which, in turn, claims the benefit of priority under 35 U.S.C. § 119 of European Patent Application Serial No. 11305743.4, filed on Jun. 14, 2011, the contents of which are relied upon and incorporated herein by reference in their entireties as if fully set forth below.

FIELD

The present invention relates to methods to easily scale up from microreactor lab scale testing and reaction development to industrial production.

BACKGROUND

Continuous flow micro reaction technology is very promising technology, as it offers, as compared to the traditional batch system, a very uniform residence time, much better thermal control, and a lower hold-up, leading to a significant step change in terms of chemical yield and selectivity, and safety.

Continuous flow microreactors are now widely used in labs for testing and developing new routes of synthesis. For laboratory and development work, they offer a very small hold-up with a sufficient residence time, leading to a very small use of material for testing, which is of particular interest in the development phase, shortening the time required to make a requested quantity, and when the raw material is expensive. In addition, the small amount of material involved reduces safety and environmental risks significantly.

The typical throughput of these devices ranges from less than one milliliter per minute to a few dozens of milliliters per minute.

These devices are usually formed in glass or in plastic (e.g. PDMS), which allows visually observation of the advancement of the reaction, and makes them cheap (in some cases even disposable), and easily reconfigurable.

Once a new process has been established, the challenge is to scale for mass production, with much larger throughput (up to several thousands of milliliters per minute). In addition, the properties of the reactor in terms of heat transfer, mixing, residence time distribution, and with a lower or at least the same pressure drop should be maintained.

Entering into mass production thus typically requires using several units in parallel to cope with the total quantity of product required.

The complete duplication of one reactor line, with all its related equipment (feeding pumps, control loops, sensing, supervisory personnel, and so forth) would typically be the easiest way to place several units in parallel, and is often known as "numbering up."

However, "numbering up" can result in systems that are too complex, too maintenance-hungry, and/or too expensive to operate.

SUMMARY

The present disclosure includes a method of a reactor design and use which allows the increase of production rates of continuous micro reactors by adjusting the physical properties of the material the micro-reactor is made of, as well as certain specific dimensions, allowing a higher throughput while keeping the same performance, particularly in heat transfer capacity.

In particular, according to one aspect of the present disclosure, a method is disclosed for the seamless scale-up of a micro reactor process, to transfer lab test to a pilot or production unit, the process comprising the steps of using a wall material for the lab reactor with a thermal conductivity lower than 3 W/m·K, and using a wall material for the production reactor with a thermal conductivity higher than 5 W/m·K. According to one embodiment, the velocity is kept constant, and the height of the channel is determined, in order to keep the volumetric heat transfer properties constant, according to the formula:

$$H_G = \frac{2 \times \left(A + \frac{B}{\lambda_W} + \frac{1}{C \times (D_h)^{(b-1)}}\right)^{-1}}{h} = H_{G0}$$

According to another embodiment, the pressure drop and the volumetric heat transfer properties are kept constant, while the channel height and the velocity are selected as calculated according to the simultaneous solution of the following two formulas:

$$H_G = \frac{2 \times \left(A' + \frac{B'}{\lambda_W} + \frac{1}{C' \times Ve \times (D_h)^{(b-1)}}\right)^{-1}}{h} = H_{G0}$$

and $$\Delta P = \left(D' \times \frac{Ve^{(3+d)}}{D_h^{(1-d)}} + E' \times \frac{Ve^3}{D_h}\right) \times \frac{2}{Ve_0} = \Delta P_0.$$

Further embodiments and particular advantages of the present disclosure are described below in the detailed description.

DETAILED DESCRIPTION

Figure 1:
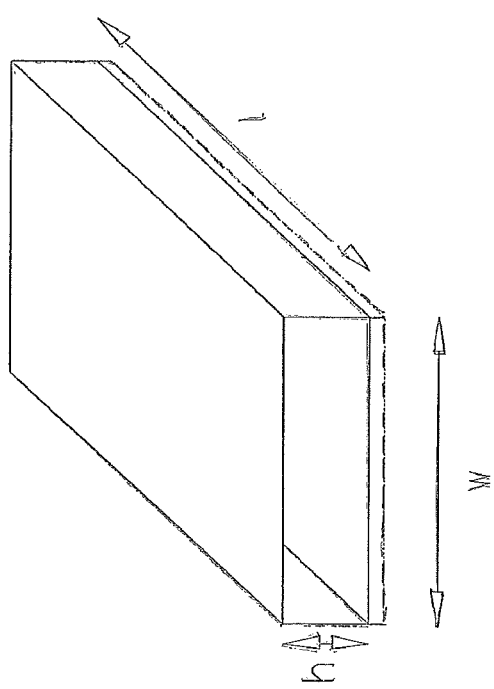
FIG. 1 is a typical scheme of a rectangular channel with a length l, a width w, and a height h.

A micro reactor can be seen as a combination of channels that may have different shape and width. For the ease of the following discussion, we will take a rectangular channel wilt a length l, a width w, a height h, as depicted in FIG. 1. Any other shape of channel could be used without affecting the invention.

The volume of this reactor is $V = w \times h \times l$. To make the demonstration easier, we will take the width of the channel as being high as compared to the height ($w \gg h$). The heat transfer area S is then equal to $S \sim 2 \times l \times w$, but the basic features of this disclosure will still be valid for any ratio between the width and the height of the channel.

Accordingly, the hydraulic diameter of the channel will be:

$$D_h = \frac{4 \times (w \times h)}{2 \times (w+h)} \approx 2 \times h \quad (1)$$

To achieve a defined reaction yield, a given residence time is required, and accordingly is set constant for the following discussion. For a change in the desired flow rate, the desired residence time is maintained by a corresponding change in the volume of the reactor.

Let's assume that the objective is to double the production rate. Accordingly, the flow rate will be multiplied by 2. We could then simply double the volume of the channel by doubling one of the three dimensions.

Multiplying the length by 2 would keep the hydraulic diameter, and basically double the velocity, the Reynolds number (Re), and the length of the channel. This would lead to a pressure drop nearly 8 times higher than the base case (basically a factor nearly 4 effect for doubling the velocity, and a factor 2 effect for doubling the channel length), which is unacceptable.

Increasing the width could be nice because it would keep the velocity constant, the Re constant, and the hydraulic diameter constant, while scaling the heat transfer surface along with the width. Accordingly, most of the properties of the microreactor (heat transfer, pressure drop, and others) would be kept at the same value. However, a large channel that is too large relative to the diameter of the feeding pipe would lead to fluid distribution problems along the width of the channel, resulting in poor mixing and poor residence time distribution. Further, if the width of the channel is not negligible compared to the length, internal by-pass can occur, and the full heat transfer surface, as well as the full volume of the channel, would not be used properly. In addition, a channel to large in width will decrease the pressure resistance, of the channel, and thereby limit the field of application of the microreactor.

Multiplying the height of the channel by 2, in contrast, will keep the velocity constant, and multiply the hydraulic diameter by 2 (where w>>h), and, accordingly, the pressure drop will be divided by 2, which has a positive impact. As the hydraulic diameter will be multiplied by 2, the Reynolds number will be multiplied by 2 as well. The properties or effects linked to velocity (pressure drop at singularities, macro mixing effects, and the like) will be kept at the same value. Keeping the velocity constant will keep the length of the channel the same for the same processing time. Although the increase in Reynolds number may cause slight changes in fluid behavior, provided that the flow remains within the same flow regime (laminar, transient, or turbulent), the changes will not be very significant—and for most flow properties or effects, the impact of increasing Reynolds number will tend to be beneficial.

Because heat transfer is essentially all through the "floor" and "ceiling" of the channel in devices of this type, doubling the height of the channel also means, however, that the heat transfer surface will be kept constant ($S=2 \times l \times w$), whereas the channel volume will be multiplied by 2. Therefore, the volumetric heat transfer coefficient, which characterizes the ability of the micro reactor to keep the temperature of the volume of the fluid constant, will be divided by 2—assuming that the height increase has no direct impact on the heat transfer coefficient itself—which is generally not acceptable.

If we keep the same heat transfer surface while increasing the volume by a factor of 2, the only way to keep the volumetric heat transfer to a constant value is to double the value of the heat transfer coefficient.

So the issue becomes how to increase the heat overall volumetric heat transfer coefficient when the height of the channel is increasing.

The overall heat transfer coefficient of the micro reactor is the resulting combination of three partial heat transfer coefficients: (1) the utility heat transfer coefficient $U_{HE}$ (Watt/m²·K), (2) the wall heat transfer coefficient $U_W$ (Watt/m²·K), and (3) the process heat transfer coefficient $U_P$ (Watt/m²·K). The overall surface heat transfer coefficient $U_G$ is a non linear relationship between these three partial coefficients:

$$U_G = \left( \frac{1}{U_{HE}} + \frac{1}{U_W} + \frac{1}{U_P} \right)^{-1} \quad (2)$$

And the overall volumetric heat transfer coefficient that should be kept constant is given by:

$$H_G = \frac{U \times S}{V} = \frac{U \times 2 \times w \times l}{w \times l \times h} = \frac{2 \times \left( \frac{1}{U_{HE}} + \frac{1}{U_W} + \frac{1}{U_P} \right)^{-1}}{h} \quad (3)$$

To keep $H_G$ constant when h is increasing requires increasing in the same proportion the value of the overall surface heat transfer coefficient $U_G$. Accordingly, at least one of the three partial heat transfer coefficients $U_{HE}$, $U_W$, and $U_P$ must be increased.

$U_{HE}$ is generally already optimized in microfluidic channel or module designs, and an increase of the value of this coefficient would lead to an consequent increase of pressure drop that could either lead to an operating pressure in excess of the design pressure, or to a pressure higher than the operating pressure of the utilities of the end user. Therefore, this factor will be kept constant.

$U_P$ can be calculated by a formula such as $$U_P = \frac{Nu \times \lambda}{2 \times h} \quad (4)$$

Where the Nusselt criteria Nu can be calculated by:

$$Nu = a \times Re^b \times Pr^c \quad (5)$$

With a, b, and c being constants determined from experimental measurements, the values being specific to a given pattern.

[The determination of the coefficients a, b, and c is a well-known practice in the heat transfer industry, known to those of skill in the art. The general practice is that a number of measurements are performed in two steps: In the first step, the Pr (Prandtl number) is kept constant, while the Re (Reynolds number) is varied, and the Nusselt criteria or Nusselt number Nu is measured. The obtained value of Nu is then plotted versus Re in a log-log graph, and the slope of the obtained straight line gives the value of b. Repeating with Re held constant and various values of Pr gives the value of c. Then the value of a is easy to determine.]

$U_P$ can therefore been written as:

$$U_P = a \times Ve \times (2 \times h)^{(b-1)} \times \rho^b \times \mu^{(c-1)} \times \lambda^{(1-c)} \times Cp^c \quad (6)$$

Where Ve is the velocity of the process fluid; $\rho$ is the process fluid density; $\mu$ is the process fluid viscosity; $\lambda$ is the process fluid thermal conductivity; and Cp is the process fluid heat capacity.

Accordingly, we can see that $U_P$ can be written as a product of terms linked to the process fluid thermal properties, and terms linked to parameters that can be adjusted (such as height of the channel and fluid velocity).

If we mark the parameters linked to the intrinsic physical properties of the fluid with a *, the above equation can be further written as:

$$U_P = a \times Ve \times (2 \times h)^{(b-1)} \times \rho^{*b} \times \mu^{*(c-1)} \times \lambda^{*(1-c)} \times Cp^{*c} \quad (7)$$

or in a simpler way:

$$U_P = K \times Ve \times (2 \times h)^{(b-1)} \quad (8)$$

taking K as independent of the fluid velocity and of the height of the channel.

If $\lambda_w$ is the wall material thermal conductivity and e its thickness, then $U_w$ can be written as:

$$U_W = \frac{\lambda_W}{e} \quad (9)$$

Substituting and solving for $H_G$: as a function of h, gives $$H_G = \frac{2 \times \left(\frac{1}{U_{HE}} + \frac{e}{\lambda_W} + \frac{1}{K \times Ve \times (2 \times h)^{(b-1)}}\right)^{-1}}{h} \quad (10)$$

The objective as discussed above is to keep $H_G$ constant, while increasing the height h of the channel of a micro reactor. The parameters that could potentially be changed are the wall thickness e, the fluid velocity Ve and the wall thermal conductivity $\lambda_W$. Although the thickness of the wall e could be reduced; such reduction would generally have an adverse impact on the mechanical properties of the micro reactor. Instead, according to the present disclosure, the increase of the height of the channel h is should be fully compensated, in terms of maintaining a constant volumetric heat transfer coefficient, by changing the wall material to a material of a higher thermal conductivity.

According to one embodiment of the present disclosure, the velocity is kept constant. The velocity is kept constant to keep as many as possible of the flow parameters (mixing, residence time distribution) at the same value. Thus, in this embodiment, the height of the channel h is adjusted to match a change or variation of wall thermal conductivity according to the following formula:

$$H_G = \frac{2 \times \left(A + \frac{B}{\lambda_W} + \frac{1}{C \times (2 \times h)^{(b-1)}}\right)^{-1}}{h} = H_{G0} \quad (11)$$

with A, B, C being constant.

EXAMPLES

For the following numerical examples, it is assumed that the Nusselt law for the channel is given by the following empirically derived formula:

$$Nu = \frac{7}{10000} \times Re^{0.98} \times Pr^{0.8} \quad (12)$$

However, any other relation with different parameters could be used with the method disclosed herein and would not change the principle of the disclosure.

Example 1

In a first example, we assume that the process fluid is an organic solvent, the value of the Heat exchange partial heat transfer coefficient being equal to 8 000 W/m²K, the wall material being glass with a thermal conductivity of 1 W/m·K, and a thickness of 1.2 mm, the height of the channel being 1.5 mm. Accordingly, the overall volumetric heat transfer coefficient achieved is 400 kW/m3K. The data are summarized below in Table 1A:

TABLE 1A

|  |  | HE | wall | process |
|---|---|---|---|---|
| ρ | kg/m3 |  |  | 860 |
| μ | cP |  |  | 0.5 |
| Cp | J/g |  |  | 1.68 |
| λ | w/m · K |  | 1 | 0.13 |
| channel height | mm |  |  | 1.5 |
| wall thickness | mm |  | 1.2 |  |
| fluid velocity | m/s |  |  | 2.2 |
| Re |  |  |  | 11352 |
| Pr |  |  |  | 6.5 |
| Nu |  |  |  | 11.53 |
| H | W/m²K | 8000 | 833 | 500 |
| Hg | W/m²K |  | 301 |  |
| Ug | kW/m³K |  | 400 |  |

If we now change the wall material and go to Alumina instead of glass, with a thermal conductivity of 27 W/m·K, while keeping the wall thickness at the same value, then we can increase the channel height from 1.5 to 2.2 mm, which is an increase of nearly 50%, while keeping the thermal properties at the same level, as shown below in Table 1B:

TABLE 1B

|  |  | HE | wall | process |
|---|---|---|---|---|
| ρ | kg/m3 |  |  | 860 |
| μ | cP |  |  | 0.5 |
| Cp | J/g |  |  | 1.68 |
| λ | w/m · K |  | 27 | 0.13 |
| channel height | mm |  |  | 2.2 |
| wall thickness | mm |  | 1.2 |  |
| fluid velocity | m/s |  |  | 2.2 |
| Re |  |  |  | 16736.6 |
| Pr |  |  |  | 6.5 |
| Nu |  |  |  | 16.35 |
| H | W/m²K | 8000 | 22500 | 481 |
| Hg | W/m²K |  | 444 |  |
| Ug | kW/m³K |  | 400 |  |

Example 2

In a second example, we assume that the process fluid is similar to water, the value of the Heat exchange partial heat transfer coefficient being equal to 8 000W/m²K, the wall material being glass with a thermal conductivity of 1 W/m·K, and a thickness of 1.3 mm, the height of the channel being 1.5 mm. Accordingly, the overall volumetric heat transfer coefficient achieved is 710 kW/m³K. The data are summarized below in Table 2A:

TABLE 2A

|  |  | HE | wall | process |
|---|---|---|---|---|
| ρ | kg/m3 |  |  | 1000 |
| μ | cP |  |  | 0.55 |
| Cp | J/g |  |  | 4.18 |
| λ | w/m · K |  | 1 | 0.6 |
| channel height | mm |  |  | 1.5 |
| wall thickness | mm |  | 1.3 |  |
| fluid velocity | m/s |  |  | 3 |
| Re |  |  |  | 16360 |
| Pr |  |  |  | 3.8 |
| Nu |  |  |  | 11.12 |
| H | W/m²K | 8000 | 769 | 2223 |
| Hg | W/m²K |  | 533 |  |
| Ug | kW/m³K |  | 710 |  |

If we now change the wall material and go to Silicon Carbide inside of glass, with a thermal conductivity of 140 W/m·K, while keeping the wall thickness at the same value, then we can increase the channel height from 1.5 to 3.6 mm, which is an increase of nearly 2.5 times, while keeping the thermal properties at the same level, as shown below in Table 2B:

TABLE 2B

|  |  | HE | wall | process |
|---|---|---|---|---|
| ρ | kg/m3 |  |  | 1000 |
| μ | cP |  |  | 0.55 |
| Cp | J/g |  |  | 4.18 |
| λ | w/m · K |  | 140 | 0.6 |
| channel height | mm |  |  | 3.6 |
| wall thickness | mm |  | 1.3 |  |
| fluid velocity | m/s |  |  | 2.2 |
| Re |  |  |  | 28730 |
| Pr |  |  |  | 3.8 |
| Nu |  |  |  | 18.45 |
| H | W/m²K | 8000 | 107692 | 1541 |
| Hg | W/m²K |  | 1277 |  |
| Ug | kW/m³K |  | 710 |  |

Therefore the benefit for the end user ranges from 25% to nearly 250%, which means that, in the latter case, it would require 2.5 time less equipment to make the same production with an industrial reactor made of SiC than if the original material, used for the lab tests, had been also used for production. An additional positive effect in that case is that the process pressure drop has been significantly reduced, allowing further saving in the design of the process pump and on the energy consumption.

An additional benefit is that, because the thermal performance can be predicted with a very good accuracy, there is no need to conduct further tests when changing the wall material, which can save a lot of development time and money.

More generally, based on the formula mentioned above, it is easy to plot a relationship between the wall material thermal conductivity and the height of the channel to keep the same thermal performance.

Figure 2:
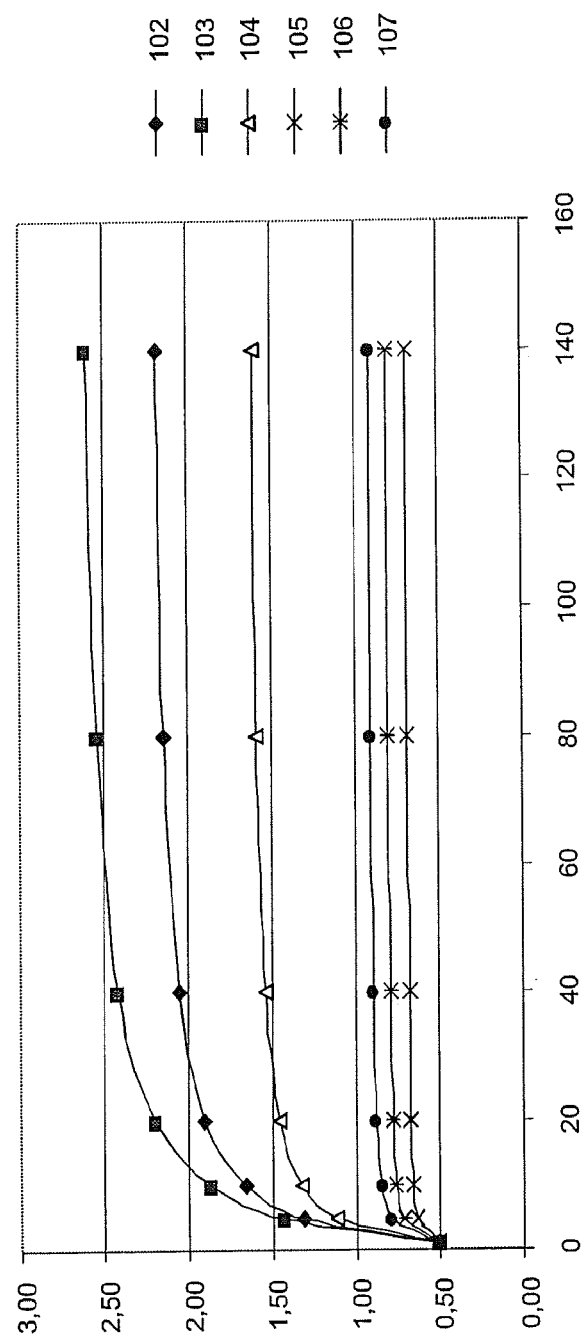
FIG. 2 represents the variation of the height of the module h, according to the present disclosure, to beep the same thermal performance while the thermal conductivity of the material of the wall is changed.

FIG. 2 is an example of such curve. Several cases are plotted, according to the fluid physical properties (water or organic fluid), and the process fluid velocity (1.2, 2.2, or 3.2 m/s), for an initial channel height with glass of 0.5 mm.

Based on these curves, it is easy to determine what would be the height of the channel, according to the type of fluid and the initial velocity, to achieve the same thermal performance as with the prototyping equipment in glass.

The embodiment above and the examples given have been made with an assumption that w>>h to ease the illustration and make calculation simpler. However, the principle remains exactly the same in a more general case where the width of the channel w is not significantly larger than the channel height h. In that case, the hydraulic diameter is given by:

$$D_h = \frac{2 \times (w \times h)}{(w + h)} \quad (12)$$

and the objective is then, in the general case, to adjust the height of the channel h according to a variation of the wall thermal conductivity according to the following formula:

$$H_G = \frac{2 \times \left(A + \frac{B}{\lambda_W} + \frac{1}{C \times (D_h)^{(b-1)}}\right)^{-1}}{h} = H_{G0} \quad (13)$$

In another alternative embodiment, the velocity of the process fluid is increased rather than maintained at the same level, in order to provide a further increase of the partial process heat transfer coefficient UP, while keeping the pressure drop at the same level as in the lab or prototyping equipment. In this embodiment, order to keep the residence time constant, the length of the channel has to be increased in the same proportion as the velocity increase. The principle of optimization remains the same, however: the height of the channel is adjusted according to a variation of the wall thermal conductivity, but in addition, the velocity is determined in order to keep the pressure drop constant. In the case where the width of the channel is much larger than the height:

$$\Delta P = \left(D' \times \frac{Ve^{(2+d)}}{h^{(1-d)}} + E' \times \frac{Ve^2}{h}\right) \times \frac{Ve}{Ve_0} = \Delta P_0 \quad (14)$$

Or $$\Delta P = \left(D' \times \frac{Ve^{(3+d)}}{h^{(1-d)}} + E' \times \frac{Ve^3}{h}\right) \times \frac{1}{Ve_0} = \Delta P_0 \quad (15)$$

The optimization thus requires finding a solution of the two following equations with two parameters (h and Ve), which may be easily found with any conventional method:

$$H_G = \frac{2 \times \left(A' + \frac{B'}{\lambda_W} + \frac{1}{C' \times Ve \times (2 \times h)^{(b-1)}}\right)^{-1}}{h} = H_{G0} \quad (16)$$

$$\Delta P = \left(D' \times \frac{Ve^{(2+d)}}{h^{(1-d)}} + E' \times \frac{Ve^2}{h}\right) \times \frac{Ve}{Ve_0} = \Delta P_0 \quad (17)$$

In the more general case, where h cannot be neglected compared to the channel width w, the equations to be solved by any appropriate conventional methods are:

$$H_G = \frac{2 \times \left(A' + \frac{B'}{\lambda_W} + \frac{1}{C' \times Ve \times (D_h)^{(b-1)}}\right)^{-1}}{h} = H_{G0} \quad (18)$$

$$\Delta P = \left(D' \times \frac{Ve^{(3+d)}}{D_h^{(1-d)}} + E' \times \frac{Ve^3}{D_h}\right) \times \frac{2}{Ve_0} = \Delta P_0 \quad (19)$$

The methods disclosed herein allow seamless scale-up of a micro reactor processes from lab test or prototyping to production, while keeping the overall performance of the equipment, and particularly the volumetric heat transfer capacity, at the same level. This will lead to a significant reduction in the number of reactors required in parallel, reducing the installation and maintenance cost, and to a significant increase in reliability and predictability in implementing micro reaction technology, without requiring full-scale production equipment for reaction and process characterization.

In some cases, the reduction of the number of reactors in parallel will even make feasible production operations that could not have been envisioned due to the high number of reactor requested without the use of the disclosed methods. Additionally, the disclosed methods provide a way to determine easily the height increase that can be made without making an additional pilot phase to validate the impact of the scale-up, which otherwise would take significant time and effort.

As the time to market is a key element in the competitiveness of a product, especially in the fine chemical and pharmaceutical industry, the reduced time to market will lead to a significant margin increase.

Although the examples above all use glass for the lab reactor, other materials having thermal conductivity lower than 3 W/m·K, thought not currently preferred, may be used, such as filled glasses or other composite materials, for example, or even organic materials, where appropriate for the reaction(s) under development.

The seamless scale-up methods disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerization; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

What is claimed is:

1. A method for a seamless scale-up of a continuous-flow microreactor process, to transfer reactions characterized or developed at a laboratory reactor directly to a pilot or production reactor, with limited or no additional experimentation, the method comprising the steps of:

processing a reaction, in a laboratory reactor using a wall material for the laboratory reactor resulting in a thermal conductivity across the laboratory reactor wall material lower than 3 W/m-K, and afterwards processing the reaction in a pilot or production reactor using a wall material for the pilot or production reactor resulting in a total thermal conductivity across the pilot or production reactor wall material higher than 5W/m-K, wherein a fluid velocity in the pilot or production reactor is kept the same as a fluid velocity in the laboratory reactor, and a channel height in the pilot or production reactor is determined, in order to keep volumetric heat transfer properties constant, according to the formula:

$$H_G = \frac{2 \times \left(A + \frac{B}{\lambda_W} + \frac{1}{C \times (D_h)^{(b-1)}}\right)^{-1}}{h} = H_{G0}$$

wherein $H_G$ is an overall volumetric heat transfer coefficient in the pilot or production process; A, B, and C are constants; $D_h$ is a hydraulic diameter of the channel in the pilot or production reactor; $\lambda_W$ is a thermal conductivity of the wall in the pilot or production reactor; b is an empirically determined power to which the Reynolds number (Re) is raised in the equation for the Nusselt criteria (Nu=a·Re$^b$Pr$^c$) for the type of flow in the pilot or production reactor; coefficients a and c have empirically determined values; Pr is the Prandtl number; h is the height of the channel in the pilot or production reactor; and $H_{G0}$ is an overall volumetric heat transfer coefficient in the laboratory reactor.

2. A method for a seamless scale-up of a continuous-flow microreactor process, to transfer reactions characterized or developed at a laboratory reactor directly to a pilot or production reactor, with limited or no additional experimentation, the method comprising the steps of:

processing a reaction, in a laboratory reactor using a wall material for the laboratory reactor resulting in a thermal conductivity across the laboratory reactor wall material lower than 3 W/m-K, and afterwards processing the reaction in a pilot or production reactor using a wall material for the pilot or production reactor resulting in a total thermal conductivity across the pilot or production reactor wall material higher than 5W/m-K, wherein a pressure drop and volumetric heat transfer properties in the pilot or production reactor are kept the same as in the laboratory reactor, a channel height and a velocity in the pilot or production reactor being selected as calculated according to the simultaneous solution of the following two formulas:

$$H_G = \frac{2 \times \left(A' + \frac{B'}{\lambda_W} + \frac{1}{C' \times Ve \times (D_h)^{(b-1)}}\right)^{-1}}{h} = H_{G0}$$

and $$\Delta P = \left(D' \times \frac{Ve^{(3+d)}}{D_h^{(1-d)}} + E' \times \frac{Ve^3}{D_h}\right) \times \frac{2}{Ve_0} = \Delta P_0$$

wherein $H_G$ is an overall volumetric heat transfer coefficient in the pilot or production reactor; A', B', and C' are constants; $D_h$ is a hydraulic diameter of the channel in the pilot or production process; $\lambda_W$ is a thermal conductivity of the wall in the pilot or production reactor; Ve is the fluid velocity in the pilot or production reactor; b is an empirically determined power to which the Reynolds (Re) number is raised in the equation for the Nusselt criteria ($Nu=a \cdot Re^b Pr^c$) for the type of flow in the pilot or production reactor; h is the height of the channel in the pilot or production reactor; coefficients a and c have empirically determined values; Pr is the Prandtl number; $H_{G0}$ is an overall volumetric heat transfer coefficient in the lab-scale reactor; $\Delta P$ is a pressure drop of the pilot or production reactor; D' and E' are constants; d is a constant; $Ve_0$ is a fluid velocity of the laboratory reactor; and $\Delta P_0$ is a pressure drop of the laboratory reactor.

* * * * *